United States Patent Office 3,209,039
Patented Sept. 28, 1965

3,209,039
STABILIZATION OF CHLORINATED
HYDROCARBONS
André Etienne, Paris, and Pierre Chassaing, Saint-Auban, France, assignors to Pechiney, Compagnie de Produits Chimiques et Electrometallurgiques, Paris, France
No Drawing. Filed May 22, 1962, Ser. No. 196,591
Claims priority, application France, May 26, 1961, 862,950
12 Claims. (Cl. 260—652.5)

This invention relates to the stabilization of halogenated hydrocarbon compounds and particularly to the stabilization of trichlorethylene.

It is well known that when trichlorethylene is exposed to air, light and/or heat, it decomposes rapidly by oxidation to form undesirable acid compounds which operate to render the solvent less adequate for the uses for which it is intended, including amongst others the degreasing of metals or textiles, or use of the solvent as a drycleaning fluid in automatic or commercial drycleaning processes and machines. The acid products that are formed are also capable of reaction with metals brought into contact therewith in the various receptacles in which the solvent is placed, such for example as iron or aluminum, to produce salts which often function as catalysts to cause decomposition of the trichlorethylene. Further, considering that trichlorethylene is often used in the processes of degreasing and cleaning wherein the solvent is recycled and in which the solvent vapors are recovered by distillation and condensation, it is very important that the agents incorporated in the solvent for stabilization distill, at least for the most part, with the trichlorethylene.

It is an object of this invention to provide a process and composition for the stabilization of trichlorethylene by means of an oxidation inhibiting agent characterized by a volatility such as to distill with and/or be carried away, for the most part, by water vapor or other vapors under the same conditions as the trichlorethylene itself.

Another object of this invention is to provide a method and composition for stabilization of halogenated hydrocarbons against oxidation in the presence of air, heat and/or light and to minimize the reaction thereof to produce acids as a by-product which might cause the decomposition of the halogenated hydrocarbon, and it is a related object to provide a stabilized composition of same.

Other objects and advantages of the present invention will be indicated in the course of the following description.

The process for stabilizing trichlorethylene, which is one of the principal objects of the present invention, consists in the addition to the halogenated hydrocarbon of an oxidation inhibiting agent comprising at least one 2-alkoxy-pyrroline compound having the formula

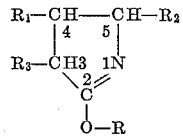

wherein R is a group selected of methyl or ethyl and in which $R_1$, $R_2$ and/or $R_3$ is a group selected from hydrogen, methyl or ethyl and in which the compound is characterized by a boiling point less than 200° C. Preferred amongst the representative compounds are methoxypyrroline and ethoxypyrroline each having boiling points at atmospheric pressure of 118 and 139° C. respectively.

In accordance with the practice of this invention, stabilization of trichlorethylene is obtained by the combination to incorporate with the trichlorethylene from 0.02 to 0.4 percent by weight of the 2-alkoxypyrroline compound based upon the weight of the trichlorethylene and preferably an amount within the range of 0.05 to 0.15 percent by weight. The data set forth in the following table illustrates the improvements obtained by the practice of this invention as evidenced by the data derived in a conventional oxidation test (Federal Specification OT 634 of the Federal Government of U.S.A. or MILT 7003 of the Armed Forces of the U.S.A.) in which the trichlorethylene, at boiling temperature, is exposed simultaneously to the action of light, oxygen and water in the presence of various metals, such as copper and steel, for 48 hours. The data set forth in the following table expresses the amount in percent by weight of hydrochloric acid released per 100 grams of trichlorethylene:

Table I

| Stabilizing agent | Amount, gr./l. | Percent HCl by weight |
|---|---|---|
| 2-Methoxypyrroline 1.2 | 0.5 | 0.04 |
| 2-Methoxypyrroline 1.2 | 1.0 | 0.001 |
| 2-Ethoxypyrroline 1.2 | 0.5 | 0.05 |
| 2-Ethoxypyrroline 1.2 | 1.0 | 0.001 |

Applicants have found further that the 2-alkoxypyrroline compound can be used alone but that it is preferable to combine the 2-alkoxypyrroline with one or more other stabilizing agents, such, for example, as phenols, alpha-epoxy compounds, esters, aliphatic alcohols, amines, unsubstituted or N-substituted pyrroles, such for example as thymol, epichlorhydrine, ethyl acetate, ethyl alcohol, N-methyl pyrrole, triethylamine, butylene oxide, methylbutynol, and diisobutylene.

A synergistic reaction appears to result from the use of the 2-alkoxypyrroline in the combination with one or more of the aforementioned stabilizing agents in the desired stabilization of the halogenated hydrocarbon against oxidation since the amount of stabilization that is achieved by the combination is greater than the sum that is achieved by the separate use of such stabilizing agents in corresponding amounts, as illustrated by the data set forth in Table II derived in accordance with the tests employed in the procurement of data for Table I.

Table II

| Stabilizing agent | Amount, gr./l. | Percent HCl by weight |
|---|---|---|
| Methoxypyrroline | 0.5 | |
| Epichlorhydrine | 1.75 | 0.02 |
| Ethyl alcohol | 2.0 | |
| 2-ethoxypyrroline | 0.5 | |
| Butylene oxide | 2.0 | 0.01 |
| Methylbutynol | 1.0 | |
| Methoxypyrroline | 1.0 | |
| Butylene oxide | 1.75 | |
| Epichlorhydrine | 1.75 | 0.001 |
| Ethyl alcohol | 2.0 | |
| N-methyl pyrrole | 0.1 | |
| Methoxypyrroline | 0.5 | 0.0005 |
| Butylene oxide | 1.0 | |
| Methoxypyrroline | 0.75 | 0.005 |
| Thymol | 0.08 | |
| Methoxypyrroline | 1.0 | |
| Triethylamine | 0.1 | 0.0008 |
| Ethyl acetate | 1.5 | |
| Diisobutylene | 2.0 | |

This synergistic effect which is obtained by the combination of the 2-alkoxypyrroline in combination with the other of the stabilizing agents for the halogenated hydrocarbons permits the use of smaller amounts of the described combination of stabilizing agents for effective protection.

The amounts of each of the additional stabilizing compounds employed in combination with the 2-alkoxypyrroline will depend upon the nature of the compound and the compound that is employed in the combination. However, by way of illustration, but not by way of limitation, the following will set forth the range in which various of the additional stabilizing agents may be employed in the combination with the 2-alkoxypyrroline in accordance with the practice of this invention:

| Compound | Broad range, percent by weight | Narrow range, percent by weight |
|---|---|---|
| Phenol | 0.002-0.07 | 0.005-0.025 |
| Ester | 0.007-0.5 | 0.10-0.30 |
| Alpha-epoxy | 0.007-0.5 | 0.10-0.30 |
| Aliphatic alcohol | 0.007-0.5 | 0.10-0.30 |
| N-alkyl pyrrole | 0.003-0.30 | 0.1-0.3 |
| Amines | 0.003-0.10 | 0.005-0.03 |

In the foregoing listing, the percent by weight designates the amount of the respective stabilizing agent based upon the weight of the halogenated hydrocarbon.

The concepts of this invention will have application also to the stabilization of other liquid halogenated hydrocarbons at ordinary temperature in addition to trichlorethylene. Such other liquid halogenated hydrocarbons which are benefited by the modification to incorporate 2-alkoxypyrroline alone or in combination with the other of the described stabilizing compounds include perchlorethylene, methyl chloride, chloroform, carbon tetrachloride, ethyl dichloride, trichlorethane, tetrachlorethane, vinylidene chloride, dichloro-1,2-ethylene, vinyl chloride, butyl chloride, and/or dichloro-1,2-propane.

It will be understood that changes may be made in the formulation and in the methods of addition to incorporate the various ingredients in combination without departing from the spirit of the invention, especially as defined in the following claims.

We claim:
1. A stabilized composition comprising a chlorinated hydrocarbon selected from the group consisting of saturated lower alkyl hydrocarbons and lower olefinic hydrocarbons and an oxidation inhibiting agent comprising at least one 2-alkoxypyrroline compound having the formula

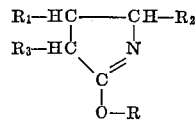

wherein R is a member selected from the group consisting of methyl and ethyl radicals and in which $R_1$, $R_2$ and $R_3$ are members selected from the group consisting of hydrogen, methyl and ethyl radicals and in which the compound is characterized by a boiling point less than 200° C.

2. The composition as claimed in claim 1 in which the 2-alkoxypyrroline is incorporated in the composition in an amount within the range of 0.05 to 0.15 percent by weight of the chlorinated hydrocarbon.

3. A stabilized composition comprising a chlorinated hydrocarbon selected from the group consisting of saturated, lower alkyl hydrocarbons and lower olefinic hydrocarbons and at least one 2-alkoxypyrroline compound having the formula

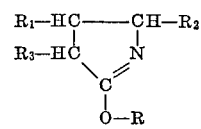

wherein R is a member selected from the group consisting of methyl and ethyl radicals and in which $R_1$, $R_2$ and $R_3$ are members selected from the group consisting of hydrogen, methyl and ethyl radicals and in which said compound has a boiling point less than 200° C., and an additional stabilizing agent.

4. The composition as claimed in claim 3 in which the additional stabilizing agent is epichlorohydrin.

5. The composition as claimed in claim 3 in which the additional stabilizing agent is ethyl alcohol.

6. The composition as claimed in claim 3 in which the additional stabilizing agent is butylene oxide.

7. The composition as claimed in claim 3 in which the additional stabilizing agent is methylbutynol.

8. The composition as claimed in claim 3 in which the additional stabilizing agent is N-methyl pyrrole.

9. The composition as claimed in claim 3 in which the additional stabilizing agent is thymol.

10. The composition as claimed in claim 3 in which the additional stabilizing agent is triethylamine.

11. The composition as claimed in claim 3 in which the additional stabilizing agent is ethyl acetate.

12. The composition as claimed in claim 3 in which the additional stabilizing agent is diisobutylene.

References Cited by the Examiner

UNITED STATES PATENTS

| | | | |
|---|---|---|---|
| 2,797,250 | 6/57 | Copelin | 260—652.5 |
| 2,803,676 | 8/57 | Willis et al. | 260—652.5 |
| 3,076,040 | 1/63 | Skeeters | 260—652.5 |

LEON ZITVER, *Primary Examiner.*

HAROLD G. MOORE, *Examiner.*